United States Patent [19]
Itoh

[11] Patent Number: 5,231,526
[45] Date of Patent: Jul. 27, 1993

[54] LIQUID CRYSTAL DISPLAY DEVICE WITH TWO INSULATING FILMS, THE SECOND IN ONLY NON-PIXEL AREAS

[75] Inventor: Nobuyuki Itoh, Tenri, Japan

[73] Assignee: Sharp Kabushiki Kaisha, Osaka, Japan

[21] Appl. No.: 929,500

[22] Filed: Aug. 18, 1992

Related U.S. Application Data

[63] Continuation of Ser. No. 547,844, Jul. 3, 1990, abandoned.

[30] Foreign Application Priority Data

Jul. 4, 1989 [JP] Japan .................. 1-173662

[51] Int. Cl.$^5$ .................. G02F 1/1343; G02F 1/1333
[52] U.S. Cl. ..................... 359/79; 359/054
[58] Field of Search ............... 350/339 R, 350 S, 333; 359/54, 79

[56] References Cited

U.S. PATENT DOCUMENTS

| | | | |
|---|---|---|---|
| 4,097,121 | 6/1978 | Tauer | 359/54 |
| 4,593,978 | 6/1986 | Mourey et al. | 359/54 |
| 4,733,948 | 3/1988 | Kitahara | 350/339 F |
| 4,763,995 | 8/1988 | Katagiri et al. | 359/79 |
| 4,932,757 | 6/1990 | Hanyu et al. | 350/339 R |
| 4,948,706 | 8/1990 | Sugihara et al. | 350/339 R |

FOREIGN PATENT DOCUMENTS

| | | | |
|---|---|---|---|
| 3631151 | 3/1987 | Fed. Rep. of Germany . | |
| 0121015 | 9/1981 | Japan | 359/79 |
| 58-33215 | 2/1983 | Japan . | |
| 59-223412 | 12/1984 | Japan . | |
| 63-148237 | 6/1988 | Japan . | |
| 63-200124 | 8/1988 | Japan . | |
| 0223727 | 9/1988 | Japan | 359/75 |
| 89-00713 | 1/1989 | PCT Int'l Appl. . | |

OTHER PUBLICATIONS

The Article Entitled "Surface-Induced Helix-Unwinding Process in Thin Homogeneous Ferroelectric Smectic Cells of DOBAMBC" to Kondo et al. Japanese Journal of Applied Physics, vol. 22, No. 5, May 1983, pp. L294-L296.

*Primary Examiner*—William L. Sikes
*Assistant Examiner*—Anita Pellman Gross

[57] ABSTRACT

The invention presents a liquid crystal display device characterized by forming pixel elements of transparent electrodes on the confronting surface of a pair of light-transmissive substrates, forming insulating films followed by orientation films on the light-transmissive substrates, and filling the gap of the light-transmissive substrates with liquid crystal.

At least on one of the light-transmissive substrates, insulation films of different materials contact the orientation film in the pixel portions and non-pixel portions, or the insulation film is formed only in the pixel portions. According to the invention, therefore, the asymmetricity of liquid crystal molecular orientation is weak in the pixel portions, and a bistable memory effect may be obtained. Further, in the non-pixel portions the orientation asymmetricity is intensified, so that a uniform clarity may be obtained.

20 Claims, 8 Drawing Sheets (a)

(b)

(c)

(d)

(a)

(b)

(c)

LIQUID CRYSTAL DISPLAY DEVICE WITH TWO INSULATING FILMS, THE SECOND IN ONLY NON-PIXEL AREAS

This application is a continuation of application Ser. No. 07/754,844 filed on Jul. 3, 1990, now abandoned.

BACKGROUND OF THE INVENTION

1. Field of the Invention

The present invention relates to a liquid cyrstal display device using a ferroelectric liquid crystal.

2. Description of the Prior Art

As the information related equipment represented by computers has been advanced recently, the role of the display device as an information transmission device is becoming more and more important. A typical conventional display device is a cathode-ray tube, but lately it has been gradually replaced by the liquid crystal device in light of the requirements for downsizing of the appliances and in the reduction of power consumption. There is also a mounting demand for liquid crystal display devices of larger area and larger capacity, of which realization is greatly desired.

As one of the means for realizing such liquid crystal display devices, the liquid crystal device using a ferroelectric liquid crystal has been developed. For the ferrodielectric liquid crystal, usually, chiral smectic liquid crystal is used. Generally, the ferroelectric liquid crystal is designed in a spiral structure in a chiral smectic. However, when implanted in a thin cell, the spiral structure is loosened due to the interface effect. This results in a coexistence of, as shown in FIG. 8 (a), a domain of liquid crystal molecules 18 inclined from a smectic layer normal 17 by an inclination angle $+\theta$ 19, and a domain inclined in the reverse direction by $-\theta$ 20. When a voltage is applied to this mixture, as shown in FIG. 8 (b), a domain of aligned spontaneous electrodes, that is, in a state of uniform molecular orientation, is obtained. Or when a voltage is reversely applied, as shown in FIG. 8 (c), a domain in a uniform molecular orientation in the reverse direction to FIG. 8 (b) is obtained. Thus, since the double refraction varies along with application and reverse application of voltage, a liquid crystal display device may be formed by using a polarizer.

In this liquid crystal device, as shown in FIG. 8 (d), even when the electric field is cut off, the molecular orientation, before cutting off the electric field, is maintained by the interface orientation defining power. Thus, a high memory effect may be obtained. In the case of a multiplex drive display of high duty, such a memory effect is very effective. In order to obtain such a memory effect of maintaining the molecular orientation even after cutting off the electric field in both states of inclination angles $+\theta$ and $-\theta$, it is required to decrease the difference in the orientation defining power between the upper and lower light-transmissive substrates and reduce the orientation asymmetricity of liquid crystal molecules. Thus, a domain inclined by $+\theta$ and a domain inclined by $-\theta$ may coexist.

A typical prior art device is explained with reference to FIG. 7. On the confronting surfaces of a pair of light-transmissive substrates 21, 22, striped transparent electrodes 23, 24 are disposed to form a matrix electrode structure, and orientation films 27, 28 are formed thereon by way of insulation films 25, 26. The gap between the light-transmissive substrates 21, 22 is filled with a ferroelectric liquid crystal 29, and polarizers 30, 31 are disposed on the outer surfaces of the substrates 21, 22. This thereby composes a ferroelectric liquid crystal display device 32.

In such liquid crystal display device, in order to obtain the memory effect in two states of $+\theta$ and $-\theta$, the asymmetricity of orientation of liquid crystal molecules is small.

In such conventional liquid crystal display device, voltage is not applied in the region other than the pixel area of the transparent electrode (non-pixel area). Further, since the asymmetricity of the orientation is small, the $+\theta$ inclined domain and $-\theta$ inclined domain coexist. Accordingly, as shown in FIG. 9, in the non-pixel area 14 of display screen of the liquid crystal display device, bright regions and dark regions (shaded) coexist. Further, the display screen looks rough, and a uniform clarity is not obtained, and the display quality is lowered.

SUMMARY OF THE INVENTION

It is hence a primary object of the invention to solve the above problems and present a liquid crystal display device enhanced in the display quality by realizing a uniform clarity in the non-pixel area as well as a bistable memory effect in the pixel area.

To acheive the above object, the invention presents a liquid crystal display device characterized by forming pixel elements composed of transparent electrodes in part of the confronting surface of a pair of light-transmissive substrates, forming orientation films on the pixel elements and non-pixel portions in the remaining surface of the light-transmissive substrates by way of insulation films, and filling the gap of the light-transmissive substrates with liquid crystal, wherein at least on one of the light-transmissive substrates, insulation films of different materials are formed to contact the orientation film at the pixel elements and non-pixel portions.

In a preferred embodiment, the insulation film formed on the pixel elements is preferably $Ta_2O_5$, $Al_2O_3$, $Si_3N_4$, $ZnO$ or $Y_2O_3$, and the insulation film formed in the non-pixel portions is preferably $SiO_2$.

The thickness of the orientation film is 500 Å or less, and the liquid crystal to be used is a ferroelectric liquid crystal.

The invention also presents a liquid crystal display device characterized by forming pixel portions of transparent electrodes in the confronting surface of a pair of light-transmissive substrates, forming orientation films on the pixel portions and non-pixel portions of the light-transmissive substrates by way of insulation films, and filling the gap of the light-transmissive substrates with liquid crystal, wherein at least on one of the light-transmissive substrates, the insulation film is formed only on the pixel portions.

In a preferred embodiment, the insulation film formed in the pixel portions is preferably $Ta_2O_5$, $Al_2O_3$, $Si_3N_4$, $ZnO$ or $Y_2O_3$, and the insulation film formed in the non-pixel portions is preferably $SiO_2$.

According to the invention, by forming different insulation films in the pixel portions and non-pixel portions, different molecular orientation characteristics considered to be due to polarity differences of the insulation films may be obtained in the pixel portions and non-pixel portions. At this time, by combining the insulation films so that the asymmetricity of orientation is weaker in the pixel portions and stronger in the nonpixel portions, a bistable memory effect will be obtained in the pixel portions, while a uniform molecular orientation inclined to either $+\theta$ or $-\theta$ will be obtained in the non-pixel portions.

In the case of forming the insulation film only on the pixel portions, a bistable memory effect is obtained in the pixel portions, while a uniform molecular orientation inclined to either $+\theta$ or $-\theta$ will be obtained in the non-pixel portions.

Thus, according to the invention, by decreasing the asymmetricity of liquid crystal molecular orientation in the pixel portions and increasing the asymmetricity of liquid crystal molecular orientation in the non-pixel portions, a bistable memory effect is obtained in the pixel portions and a uniform clarity is obtained in the non-pixel portions.

BRIEF DESCRIPTION OF THE DRAWINGS

These and further objects, features, and advantages of the invention will be more explicit from the following detailed description taken with reference to the drawings wherein.

DETAILED DESCRIPTION OF THE PREFERRED EMBODIMENTS

Figure 1:
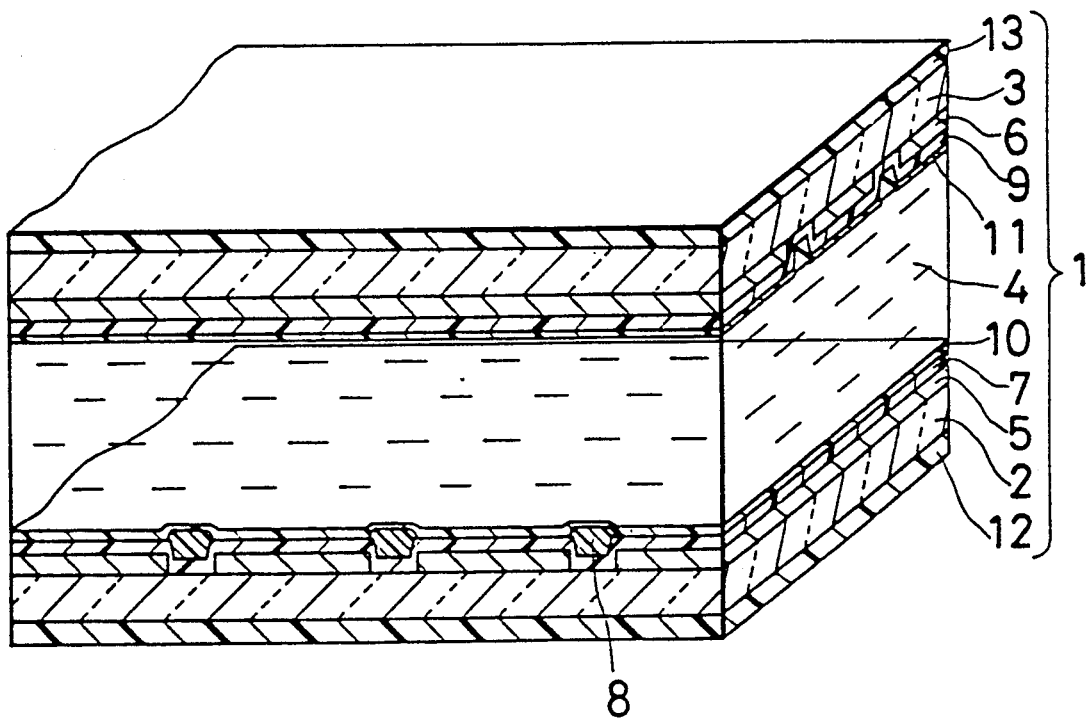
FIG. 1 is a sectional view of a liquid crystal display device in one of the embodiments of the invention.

Now referring to the drawing, preferred embodiments of the invention are described below.

FIG. 1 is a schematic sectional view of an embodiment of the invention. In FIG. 1, a ferroelectric liquid crystal display device 1 comprises light-transmissive substrates 2, 3 made of glass or the like, between which is a gap filled with a ferroelectric liquid crystal 4. On the confronting surfaces of the substrates 2, 3, striped transparent electrodes 5, 6 are disposed to form a matrix structure, and insulation films 7, 8, 9 and orientation films 10, 11 are formed in this order on the remaining surfaces of the transparent electrodes and the light-transmissive substrates. On the outer surfaces of the substrates 2, 3, polarizers 12, 13 are disposed so as to form an orthogonal Nicol.

On the entire surface of the substrate 3, $Ta_2O_5$ is evaporated by a gas sputtering technique as insulation film 9. On the substrate 2, the insulation film 7 of the same $Ta_2O_5$ is formed in the pixel portions and in the nonpixel portions, while $SiO_2$ is formed as insulation film 8 on the insulation film 7 in the non-pixel portions.

Figure 3:
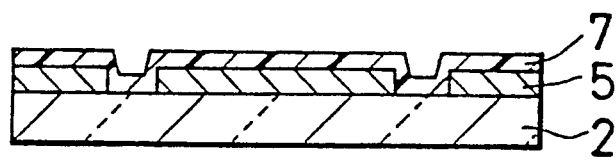
FIGS. 3(a)-3(d) are manufacturing process drawings showing the steps up to formation of insulation film of a liquid crystal display device in an embodiment of the invention.
Figure 3:
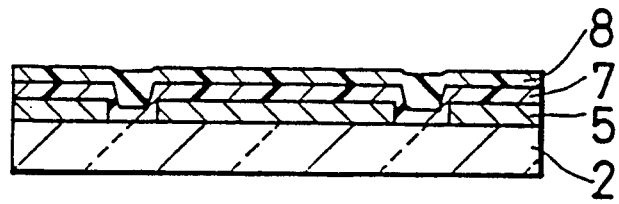
Figure 3:
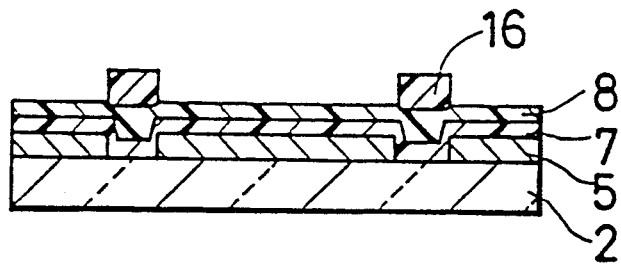
Figure 3:
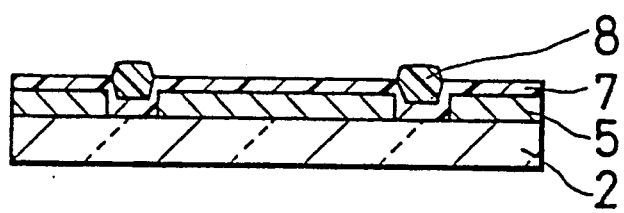

FIG. 3 is a manufacturing process drawing showing the steps of forming different insulation films on the substrate 2 in the liquid crystal display device of the same embodiment. First as shown in FIG. 3 (a), the insulation film 7 of $Ta_2O_5$ is formed by a sputtering method on the substrate 2, on which the striped transparent electrode 5 is formed. Next, as shown in FIG. 3 (b), further on its surface, an $SiO_2$ film (tradename OCD TYPE, II, manufactured by Tokyo Oka Kabushiki Kaisya) is applied as insulation film 8 by spinner coating, and is baked at 350° C. Further, as shown in FIG. 3 (c), a photoresist 16 is applied and temporarily baked at 90° C., exposed with high pressure mercury vapor lamp using a photomask corresponding to the non-electrode shape, developed, and finally baked at 120° C. In succession, as shown in FIG. 3 (d), using a mixed solution of hydrofluoric acid and nitric acid at 1:200, the surface is etched for 20 seconds to peel off the insulation film 8 of $SiO_2$ in the electrode area. Further, the photoresist 16 is peeled off by using ethylcellosolve acetate.

Although not shown in FIG. 3, further on its surface, Nylon 6 (tradename of Toray Kabushiki Kaisya, 1% methacresol solution) is applied in a thickness of 500 Å by spinner coating, and is baked to form an orientation film 10. Thus formed orientation film 10 of the substrate 2 and the orientation film 11 of the substrate 3 on which $Ta_2O_5$ is formed as insulation film 9 on the entire surface are rubbed so as to be parallel or anti-parallel, and are formed into a cell in a cell thickness of 2.0 μm. Then, the ferroelectric liquid crystal is implanted to seal, and two polarizers 12, 13 are disposed on the outer surfaces. This thereby forms the liquid crystal display device as shown in FIG. 1. Of course, the liquid crystal display device may be formed by insertion of the liquid crystal between two substrates 2.

Figure 6:
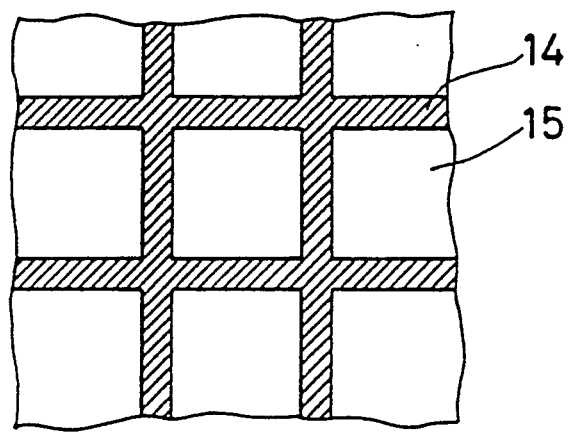
FIG. 6 is a plan view showing the display state of pixel portions and non-pixel portions of a liquid crystal display device of the invention.
Figure 7:
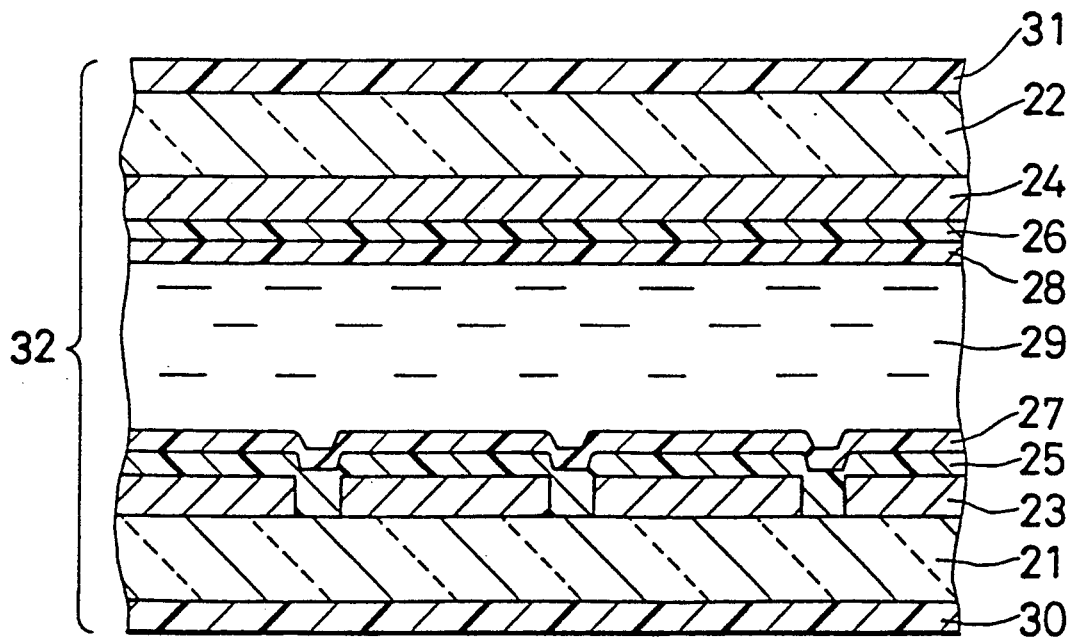
FIG. 7 is a sectional view of a liquid crystal display of a prior art device.
Figure 8:
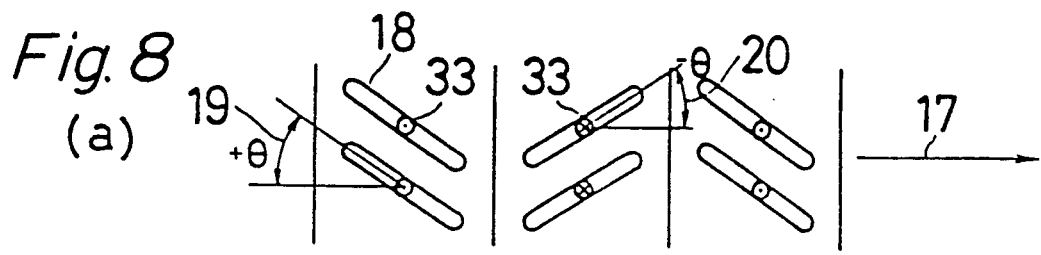
FIGS. 8(a)-8(d) are diagrams showing the operation of a ferroelectric liquid crystal.
Figure 8:
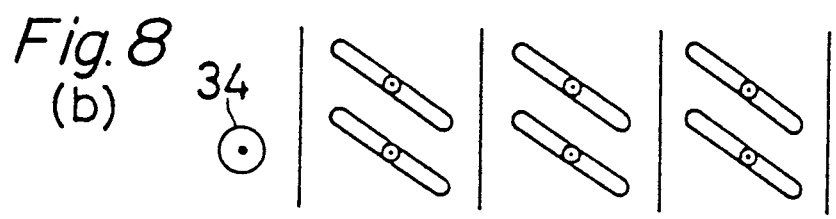
Figure 8:
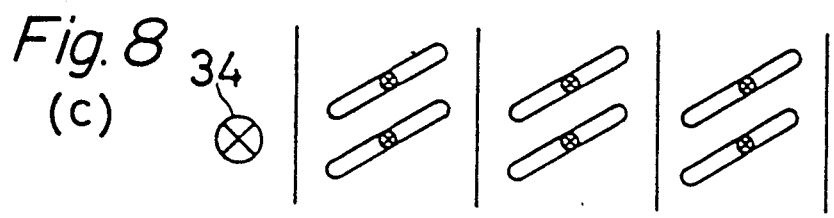
Figure 8:
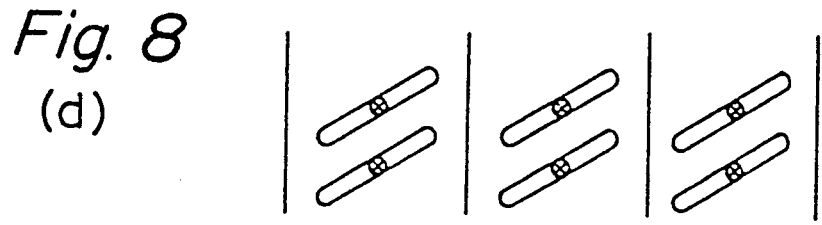
Figure 9:
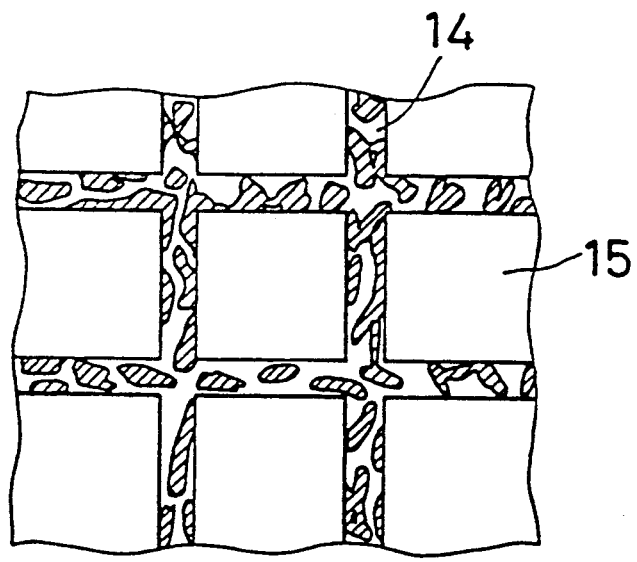
FIG. 9 is a diagram showing the display state of pixel portions and non-pixel portions of a liquid crystal display of a prior art device.

This liquid crystal display device may have different molecular orientation characteristics which are considered to be due to polarity difference of water-soluble $SiO_2$ and crystalline $Ta_2O_5$. A favorable bistable memory effect is obtained in the pixel portions, while a uniform clarity is achieved in the non-pixel portions as shown in FIG. 6.

Instead of $Ta_2O_5$ used in this embodiment, crystalline $Al_2O_3$, $Si_3N_4$, ZnO, $Y_2O_3$ or the like may be used, and the same effects will be obtained.

As for the orientation film to be formed on the insulation film, when thinly formed in a thickness of 500 Å or less, the polarity difference of insulation films seems to appear more clearly, and the uniformity of clarity will be enhanced.

Figure 2:
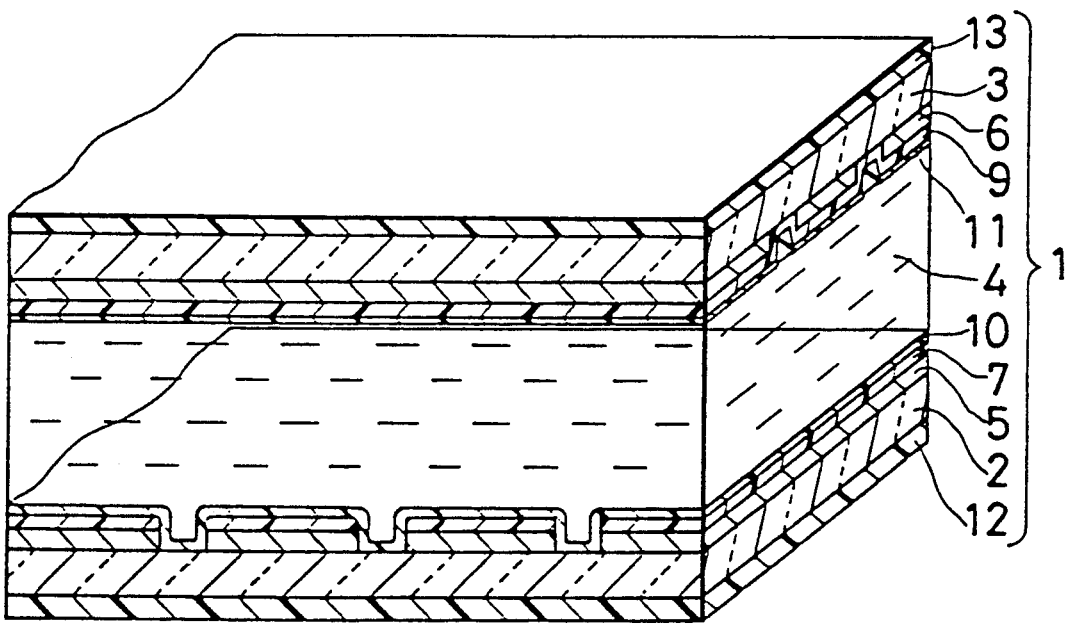
FIG. 2 is a sectional view of a liquid crystal display device in other embodiment of the invention.

FIG. 2 is a schematic sectional view of another embodiment of the invention. In this embodiment, the parts similar or corresponding to those in the foregoing embodiment are identified with the same reference numbers. What is of note is that an insulation film 9 of $SiO_2$ is formed on the entire surface of the light-transmissive substrate 3, while an insulation film of $SiO_2$ is formed only in the pixel portions of the other light-transmissive substrate 2, not in its non-pixel portions.

Figure 4:
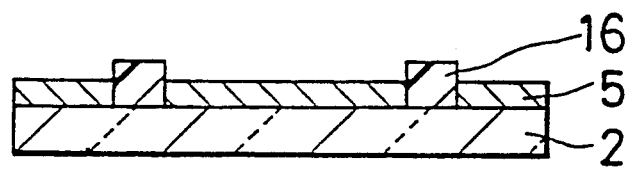
FIGS. 4(a)-4(c) are manufacturing process drawings showing the steps up to formation of insulation film of a liquid crystal display device in a different embodiment of the invention.
Figure 4:
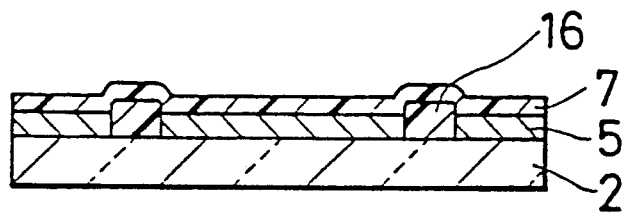
Figure 4:
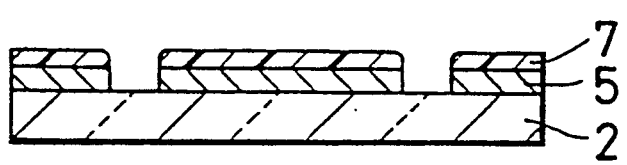

FIG. 4 (a) to FIG. 4 (c) are manufacturing process drawings showing the steps of up to forming the insulation films in the liquid crystal display device of this embodiment. In FIG. 4 (a), in the first place, a photoresist 16 is applied on the substrate 2 on which a striped transparent electrode 5 is formed, and is temporarily baked at 90° C., exposed with high pressure mercury vapor lamp using a photomask corresponding to the non-electrode shape, developed, and finally baked at 120° C. On its surface, as shown in FIG. 4 (b), as insulation film, $SiO_2$ film 7 (tradename: OCD TYPE II, manufactured by Tokyo Oka Kabushiki Kaisya) is applied by spinner coating, and baked at 350° C. Next, as shown in FIG. 4 (c), the surface is ultrasonically cleaned by using ethylcellosolve acetate, and the insulation film on the non-pixel portions is removed.

Although not shown in FIG. 4, further the same as in the foregoing embodiment, Nylon 6 (tradename of Toray Kabushiki Kaisya, 1% methacresol solution) is applied by spinner coating, and baked to form an orientation film 10. Thus formed substrate 2, and the orientation film 11 on the 1 substrate 3 of which entire surface is coated with $SiO_2$ film (tradename: OCD TYPE II, manufactured by Tokyo Oka Kabushiki Kaisya) as insulation film 9, are rubbed so as to be parallel or anti-parallel, and formed into a cell in a cell thickness of 2.0 μm. Further, the ferroelectric liquid crystal is implanted to seal, and two polarizers 12, 13 are disposed on the outer surfaces, thereby forming a liquid crystal display device as shown in FIG. 2.

Of course, the liquid crystal display device may be formed by inserting the liquid crystal between two substrates 2.

In this liquid crystal display device, a favorable bistable memory effect is obtained in the pixel portions, and a uniform clarity, as shown in shaded area in FIG. 6, is obtained in the non-pixel portions.

As for the orientation film to be formed on the insulation film, when formed thinly in a thickness of 500 Å or less, the polarity difference of the insulation films seems to appear more clearly, and the uniformity of clarity will be enhanced.

Besides, instead of $SiO_2$, $Ta_2O_5$, $Al_2O_3$, ZnO, $Y_2O_3$ or the like may be used, and similar effects will be obtained.

Figure 5:
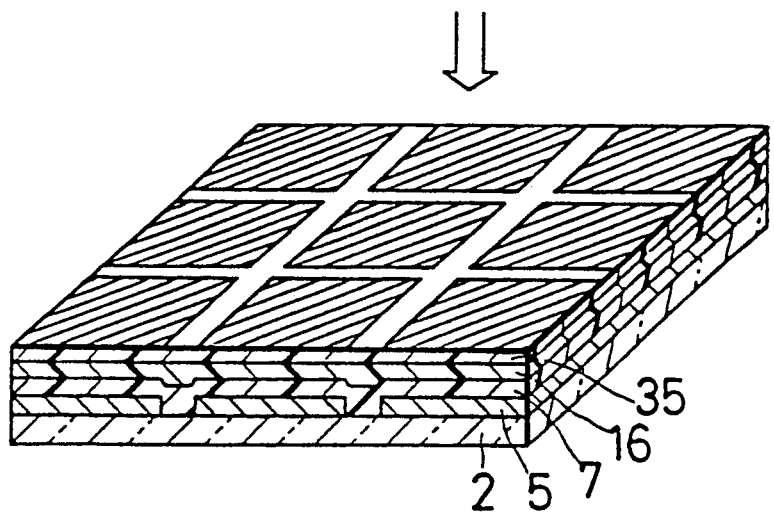
FIGS. 5(a)-5(c) are manufacturing process drawings showing the steps up to formation of insulation film of a liquid crystal display device in another embodiment of the invention.
Figure 5:
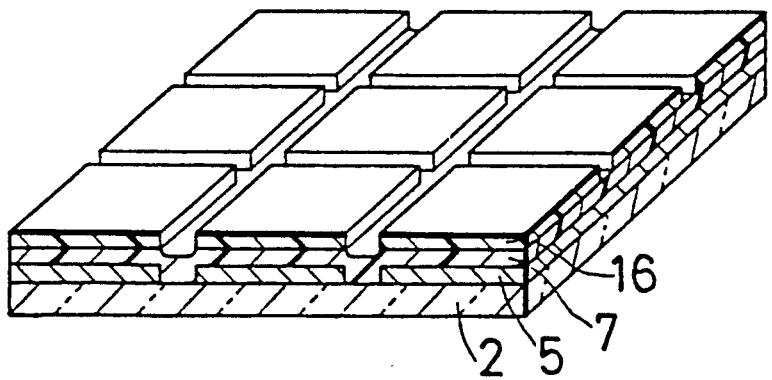
Figure 5:
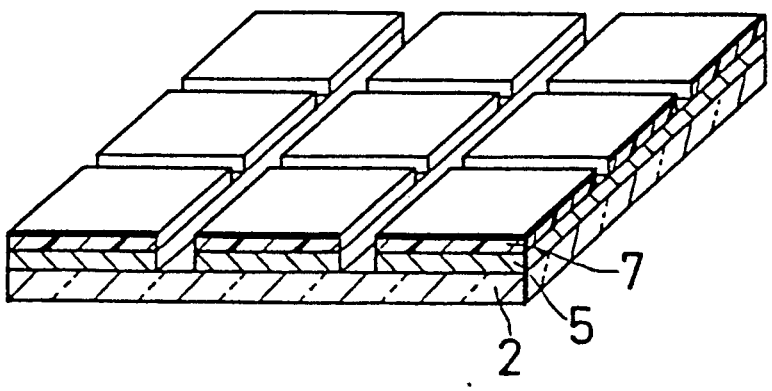

FIG. 5 is manufacturing process drawing showing the steps up to formation of insulation films of the liquid crystal device shown in FIG. 2. The steps are different from those of the preceding embodiment.

As shown in FIG. 5 (a), $SiO_2$ (tradename: OCD TYPE II, manufactured by Tokyo Oka Kabushiki Kaisya) is applied by spinner coating as insulation film 7 on a light-transmissive substrate 2 on which a striped transparent electrode 5 is formed. Further, it is baked at 350° C., and a photoresist 16 is applied, temporarily baked at 90° C., and is exposed by a high pressure mercury vapor lamp, using a photomask 35 not transmitting light to the pixel portions as indicated by oblique lines corresponding to the pixel shape. After developing as shown in FIG. 5 (b), the surface is finally baked at 120° C. Then, as shown in FIG. 5 (c), the surface is etched for 20 seconds in a mixed solution of hydrofluoric acid and nitric acid at 1:200. Further, the $SiO_2$ in the non-pixel portions is peeled off, and the photoresist 16 is peeled off in ethylcellosolve acetate.

Although not shown in FIG. 5, further thereon at the same time, the same as in the preceding embodiment, Nylon 6 (tradename of Toray Kabushiki Kaisya 1% methacresol solution) is applied in a thickness of 500 Å by spinner coating, and baked to form an orientation film 10. Thus composed substrate 2 and the orientation film 11 of the substrate 3 of which the surface is entirely coated with $SiO_2$ as insulation film 9 are rubbed so as to be parallel or anti-parallel, and formed into a cell in a thickness of 2.0 μm. Further, the ferroelectric liquid crystal is implanted to seal, and two polarizers 12, 13 are disposed on the outer surfaces, thereby forming a liquid crystal display device.

In the liquid crystal display device of the invention, a favorable bistable memory effect is obtained in the pixel portions, and a uniform clarity is obtained in the non-pixel portions.

As for the orientation film to be formed on the insulation film, when formed thinly in a thickness of 500 Å or less, the polarity difference of the insulation films seems to appear more clearly, and the uniformity of clarity will be enhanced.

Besides, instead of $SiO_2$, $Ta_2O_5$, $Al_2O_3$, ZnO, $Y_2O_3$ or the like may be used, and similar effects will be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device including a plurality of transparent row electrodes on a confronting surface of one of a pair of light-transmissive substrates, a plurality of transparent column electrodes on a confronting surface of the second substrate, first insulating film on the electrodes of at least one of the light-transmissive substrates at pixel and non-pixel portions, the pixel portions being areas where rows and columns overlap;

a second insulating film, of a material different from that of the first insulating film, formed on the first insulating film only at non-pixel portions of at least one light-transmissive substrate; and a liquid crystal material filling the gap between the light-transmissive substrates, wherein the first insulating film is a film for decreasing asymmetricity of liquid crystal molecular orientation of the liquid crystal, and the second insulating film is a film for increasing asymmetricity of liquid crystal molecular orientation of the liquid crystal.

2. A liquid crystal display device according to claim 1, wherein the first insulating film is selected from the group consisting of $Ta_2O_5$, $Al_2O_3$, $Si_3N_4$, ZnO and $Y_2O_3$, and the second insulating film is $SiO_2$.

3. A liquid crystal display device according to claim 1, wherein an orientation film is formed over the insulating films, the thickness of the orientation film being, at most 500 Å.

4. The liquid crystal display device of claim 1 wherein there is a substantial polarity difference between material of the first insulating film and of the second insulating film.

5. A liquid crystal display device including a plurality of transparent row electrodes on a confronting surface of one of a pair of light-transmissive substrates, and a plurality of transparent column electrodes on a confronting surface of the second substrate;

a first insulating film on the electrodes of one light-transmissive substrate, at only pixel portions, the pixel portions being areas where rows and columns overlap;

a second insulating film of a material which is the same as the first insulating film, on electrodes of the other light-transmissive substrate on at least the pixel portions; and a liquid crystal filling the gap between the light transmissive substrates.

6. A liquid crystal display device according to claim 5, wherein the first and second insulating films are selected from the group consisting of $SiO_2$, $Ta_2O_5$, $Al_2O_3$, ZnO and $Y_2O_3$.

7. A liquid crystal display device according to claim 1 or 5, wherein the liquid crystal is a ferroelectric liquid crystal.

8. The liquid crystal display device of claim 1 or 5 wherein the two light-transmissive substrates are made of the same material.

9. A liquid crystal display device including:

a plurality of transparent row electrodes on a confronting surface of one of a pair of light-transmissive substrates;

a plurality of transparent column electrodes on a confronting surface of the second substrate;

a first insulating film on the electrodes of at least one of the light transmissive substrates at pixel and nonpixel portions, the pixel portions being areas where rows and columns overlap;

a second insulating film, of a material different from that of the second insulating film, formed on the first insulating film only at non-pixel portions of at least one light-transmissive substrate, wherein the first insulating film is selected form the group consisting of $Ta_2O_5$, $Al_2O_3$, ZnO, and $Y_2O_3$, and the second insulating film is $SiO_2$; and a liquid crystal material filing the gap between the light transmissive substrates.

10. A liquid crystal device according to claim 9, wherein the first insulating film is a film for decreasing asymmetricity of liquid crystal molecular orientation of the liquid crystal, and the second insulating film is a film or increasing asymmetricity of the liquid crystal molecular orientation of the liquid crystal.

11. A liquid crystal display device according to claim 9, wherein the liquid crystal is a ferroelectric liquid crystal.

12. A liquid crystal display device according to claim 9, wherein the two light-transmissive substrates are made of the same material.

13. A liquid crystal display device according to claim 9, wherein there is a substantial polarity difference between material of the first insulating film and of the second insulating film.

14. A liquid crystal display device according to claim 5 or 9, wherein an orientation film is formed over the insulating films, the thickness of the orientation film being, at most, 500 Å.

15. A liquid crystal display device including:

a plurality of transparent row electrodes on a confronting surface of one of a pair of light-transmissive substrates;

a plurality of transparent column electrodes on a confronting surface of the second substrate;

a first insulating film on the electrodes of at least one of the light transmissive substrates at pixel and nonpixel portions, the pixel portions being areas where rows and columns overlap;

a second insulating film, of a material different from that of the second insulating film, formed on the first insulating film only at non-pixel portions of at least one light-transmissive substrate; and a liquid crystal material filling the gap between the light transmissive substrates, wherein an orientation film is formed over the insulating films, the thickness of the orientation film being, at most, 500 Å.

16. A liquid crystal device according to claim 15, wherein the first insulating film is a film for decreasing asymmetricity of liquid crystal molecular orientation of the liquid crystal, and the second insulating film is a film for increasing asymmetricity of the liquid crystal molecular orientation of the liquid crystal.

17. A liquid crystal display device according to claim 15, wherein the first insulating film is selected from the group consisting of $Ta_2O_5$, $Al_2O_3$, $Si_3N_4$, ZnO, and $Y_2O_3$, and the second insulating film is $SiO_2$.

18. A liquid crystal display device according to claim 15, wherein the liquid crystal is a ferroelectric liquid crystal.

19. A liquid crystal display device according to claim 15, wherein the two light-transmissive substrates are made of the same material.

20. A liquid crystal display device according to claim 15, wherein there is a substantial polarity difference between material of the first insulating film and of the second insulating film.

* * * * *